United States Patent [19]

Chaikin et al.

[11] Patent Number: 5,159,167
[45] Date of Patent: Oct. 27, 1992

[54] STRUCTURE FOR AND METHOD OF ELECTRICAL DISCHARGE MACHINING

[75] Inventors: Stephen E. Chaikin, Ann Arbor; Donald R. Brettrager, Chesaning, both of Mich.

[73] Assignee: Raycon Corporation, Ann Arbor, Mich.

[21] Appl. No.: 718,002

[22] Filed: Mar. 29, 1985

[51] Int. Cl.$^5$ .......................... B23H 7/32; B23H 7/30; B23H 1/02
[52] U.S. Cl. ................... 219/69.2; 219/69.15; 219/69.17
[58] Field of Search ................ 219/69 E, 69 G, 69 C, 219/69.15, 69.16, 69.13, 69.2

[56] References Cited

U.S. PATENT DOCUMENTS

| | | | |
|---|---|---|---|
| 3,601,572 | 8/1971 | Check | 219/69 E |
| 3,614,371 | 10/1971 | Simpkins et al. | 219/69 G |
| 3,688,074 | 8/1972 | Stirner et al. | 219/69 G |
| 3,729,609 | 4/1973 | Check et al. | 219/69 G |
| 3,855,442 | 12/1974 | Check et al. | 219/69 E |
| 4,039,779 | 8/1977 | Rupert | 219/69 G |
| 4,121,081 | 10/1978 | Baker | 219/69 E |
| 4,191,878 | 3/1980 | Check et al. | 219/69 E |
| 4,510,365 | 4/1985 | MacGregor et al. | 219/69 G |
| 4,549,061 | 10/1985 | Nicholas et al. | 219/69 E |

OTHER PUBLICATIONS

"Electrical Discharge Machining", pp. 125–127 by Jameson, Editor, Nov. 1983.

Primary Examiner—Geoffrey S. Evans
Attorney, Agent, or Firm—Gifford, Groh, Sprinkle, Patmore and Anderson

[57] ABSTRACT

Structure for and method of electrical discharge machining with a wire electrode to produce small holes including completely controlling electrical discharge machining parameters such as voltage, reactance, current and servo speed with a programmable microprocessor, central processing unit sensing first sparking between the wire electrode and the workpiece and controlling depth of cut from the position of the electrode on spark initiation electrode feeding to replenish eroded electrode through clamping sequencing between an electrical discharge machine head and an electrode carrying slide thereon. In accordance with the invention there is also provided ultrasonic vibration of at least one of the workpiece, a wire electrode guide and the electrode during machining. Also, the slide is driven by a screw and nut combination including a plastic extruded between the screw and nut to remove backlash therefrom and the tapered end of the wire electrode is removed prior to electrical discharge machining therewith by machining with the tapered end of the electrode with a reverse polarity, that is with a high wear polarity, between the electrode and workpiece, and splitting of the wire electrode is substantially eliminated by increasing the pulse time of the cutting parameters and lowering the current thereof while flushing at a low velocity.

2 Claims, 10 Drawing Sheets

STRUCTURE FOR AND METHOD OF ELECTRICAL DISCHARGE MACHINING

BACKGROUND OF THE INVENTION

1. Field of the Invention

The invention relates to electrical discharge machining and refers more specifically to structure for and a method of electrical discharge machining of small holes in workpieces with a wire electrode which structure is completely controlled by a Central Processing Unit which may be a programmable microprocessor and which invention includes structure for and the steps of sensing initial sparking between an electrode and a workpiece as a reference point for control of depth of cut, controlling voltage during machining in small increments to control hole size, feeding the electrode to compensate for electrode wear, ultrasonically vibrating one of the wire electrode wire guide and workpiece during cutting, providing a no backlash low friction screw drive for the electrode utilizing a fine pitch precision screw and loose nut with plastic therebetween, removing the tapered end of a worn electrode and eliminating electrode splitting and high velocity flushing.

2. Description of the prior Art

In the past electrical discharge machining has sometimes been partly controlled by a Central Processing Unit including a programmable microprocessor. However, complete control of the electrical discharge machining of small holes with a wire electrode is not believed to have been known.

Also, prior electrical discharge machining of wire electric has accomplished by exactly positioning a workpiece and moving an electrode a predetermine distance from an initial home position for electrode carrying structure. With such structure, the depth of cut depends on the relative position of the workpiece and structure carrying the electrode as well as the length of the electrode. The depth of cut thus changes as the electrode wears. No known electrical discharge machining structure determines wire feed control from an initial position of an electrode on sensing of a first spark at the beginning of a cut.

Electrode feed structure has been utilized in the past to compensate for electrode wear in such equipment. Electrode feed structure of the past has sometimes been by mechanical ratchet structure. Alternatively, fixed electrode feed is known based on clamping and unclamping electrode securing structure periodically. Also, electrode feed is known based on feeding the electrode end to a known position relative to but spaced from the workpiece before each cut.

With such methods of electrical discharge machining and electrode feed the exact position of the electrode tip with respect to the workpiece is seldom known and sometimes results in undesirable cuts.

Further, in the past it has been known to vary voltage in rather large increments to vary electrical discharge machine cutting. No precise hole size regulation due to complete control of electrical discharge machine cutting parameters such as voltage, has been known.

Also, a search of prior patents has not revealed a teaching of ultrasonic vibration of one of the electrode and workpiece during flushing while cutting small holes to improve electrical discharge cutting efficiency. Prior known structures sometimes pulse electrode feed structure to enhance flushing. However, such pulsing is accomplished at frequencies much lower than ultrasonic frequencies.

Further, it is not believed to have been known in the past to ultrasonically vibrate a wire guide to reduce friction between the wire guide and a fragile wire electrode in the wire guide and thus eliminate or greatly reduce compression buckling of the wire electrode and resulting loss of tolerance.

Further, in accordance with the invention, the depth of an electrical discharge machined hole is measured from the initiation of the first spark between an electrode and workpiece considering the position of the electrode at that time. The depth of the hole is thus measured from the actual start of the electrical discharge machining of a workpiece.

Electrode feed is accomplished in accordance with the present invention by clamping an electrode in a first clamp on a slide on an electrical discharge machining head at a rearward location on the electrode and moving the clamp and the electrode relative to the workpiece on the slide. The electrode thus held may be brought to a home or start position with the slide after each electrical discharge machining cut without refeeding the electrode after each electrical discharge machining cut. When it is desired to feed the electrode due to excessive wear of the electrode, another clamp on the electrical discharge machining head is actuated to grip the electrode at a forward location thereon and the slide and the first clamp which has been released are returned to the home position after which the forward location clamp is released and the rearward location clamp is again clamped to the electrode to complete incrementing the wire electrode.

Also, prior known structure has utilized expensive nut and screw or precision ball drives for advancing the electrode toward a workpiece by servo mechanism. It is believed to be unknown in the electrical discharge machining prior art to utilize a screw and nut combination for driving of the electrode wherein backlash is removed from the screw and nut by means of a plastic extruded into the space between the screw and nut of a precision screw and loose nut set.

Also, in the past the cutting of small holes has been hindered by the wearing of the electrode on the cutting end thereof in a tapered manner to provide a subsequent tapered hole. It is not believed to be known in the prior art to square off the end of the wire electrode in electrical discharge machining by wearing it away on electrical discharge cutting initially with a reverse or high wear polarity.

Also, in the past electrical discharge machining of small holes with tungsten wire has at times been greatly hindered by electrodes which split longitudinally during use and contact the sides of the holes being machined and consequently produce objectionable machining of the sides of the holes. It is not believed to have been known to eliminate this splitting of wire electrodes by control of current relative to time of the discharge pulse in electrical discharge machining with a small toroidal series inductor.

Similarly flushing between wire electrodes and workpieces at high velocity has in the past caused displacement of the wire and consequent undesirable hole characteristics.

SUMMARY OF THE INVENTION

In accordance with the invention there is provided structure for and a method of electrical dishcarge machining of small holes under the complete control of a central processing unit including a programmable microprocessor. Thus, hole size may be varied in accordance with the close control of electrical discharge machining cutting parameters such as voltage.

The electrode is also ultrasonically vibrated in accordance with the structure and method of the invention during electrical discharge machining therewith and during flushing to reduce friction in the wire guide between the fragile wire electrode and the wire guide and to increase the efficiency of electrical discharge machining.

Screw and nut drive for the slide carrying the electrode is provided in accordance with the invention on an electrical discharge machining head with screw and nut have had the backlash removed therefrom by the manufacture of a precision screw with a fine pitch and relatively loose nut and the pressure extruding of a setable plastic material between the screw and nut.

Also, the tapered end of the wire electrode in accordance with the structure and method of the invention is removed at the start of an electrical discharge machine operation by electrical discharge machining with the tapered end of the electrode with a reverse polarity, that is a high wear polarity.

Splitting of the end of the wire electrode is reduced or eliminated in accordance with the structure and method of the invention by limiting the pulse width and current of the electrical discharge machining energy to approximately five tenths of a microsecond pulse width and four amps current.

Also, flushing is accomplished in accordance with the invention at a very low velocity to reduce movement of the electrode and consequent damage to a hole in a workpiece due to cutting by the electrode when it is out of an axial position.

DESCRIPTION OF THE PREFERRED EMBODIMENT

Figure 1:
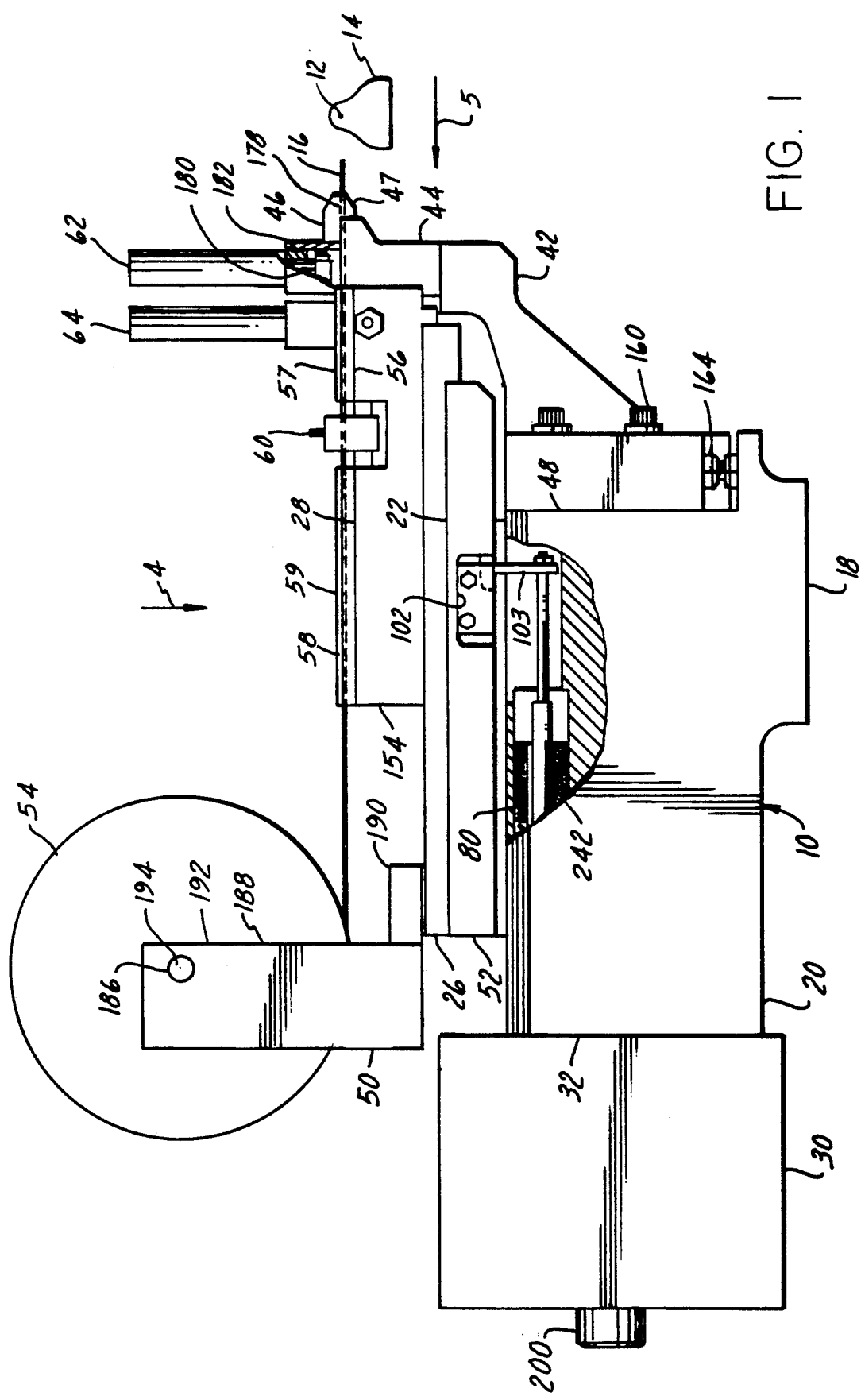
FIG. 1 is a partly broken away side view of an electrical discharge machining head constructed in accordance with the invention for practicing the method of the invention taken in the direction of arrow 1 in FIG. 5.
Figure 11:
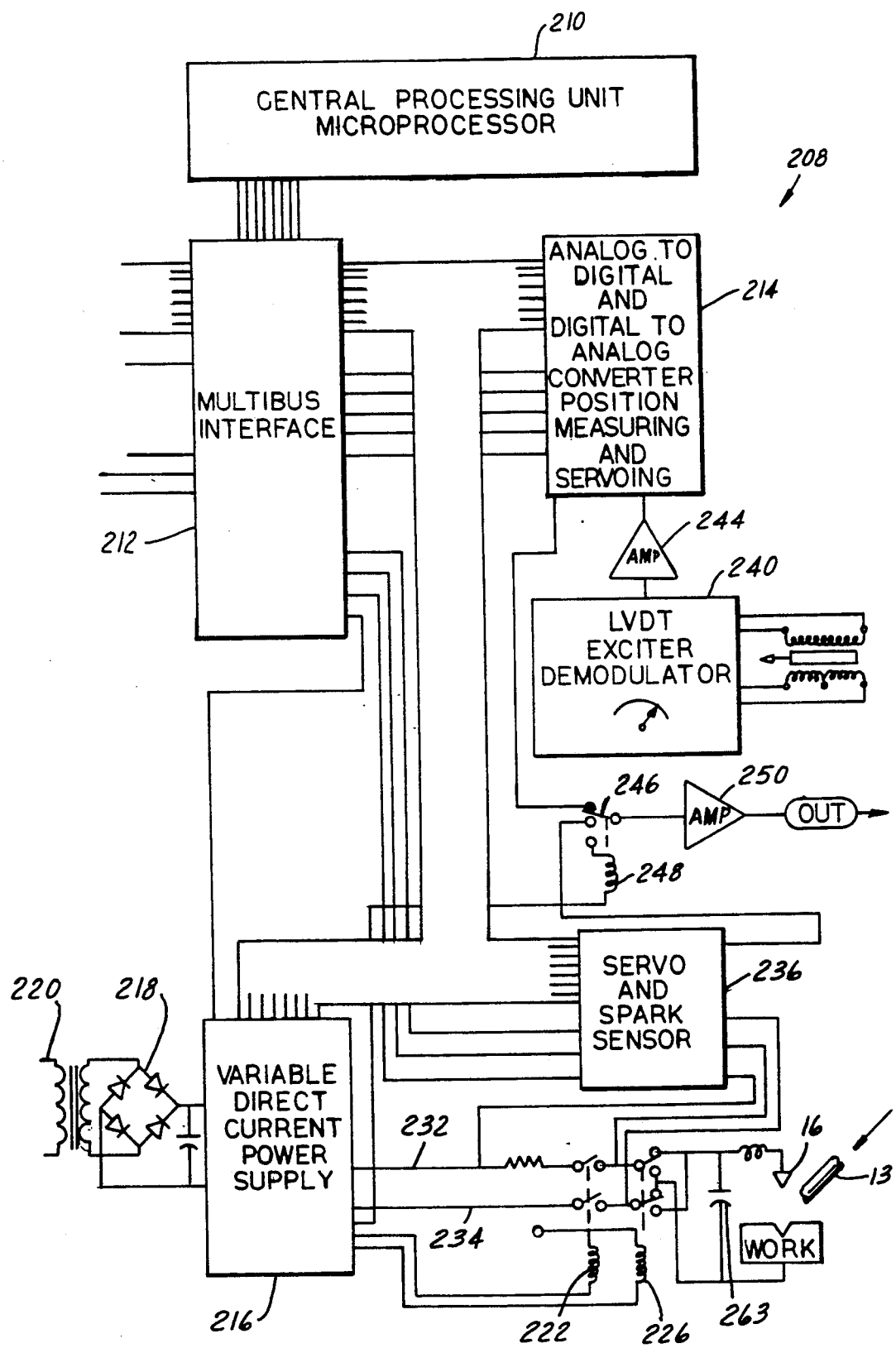
FIG. 11 is an electrical diagram partly in block form and partly in schematic form of the electrical discharge machining structure of the invention for practicing the method of the invention.
Figure 13:
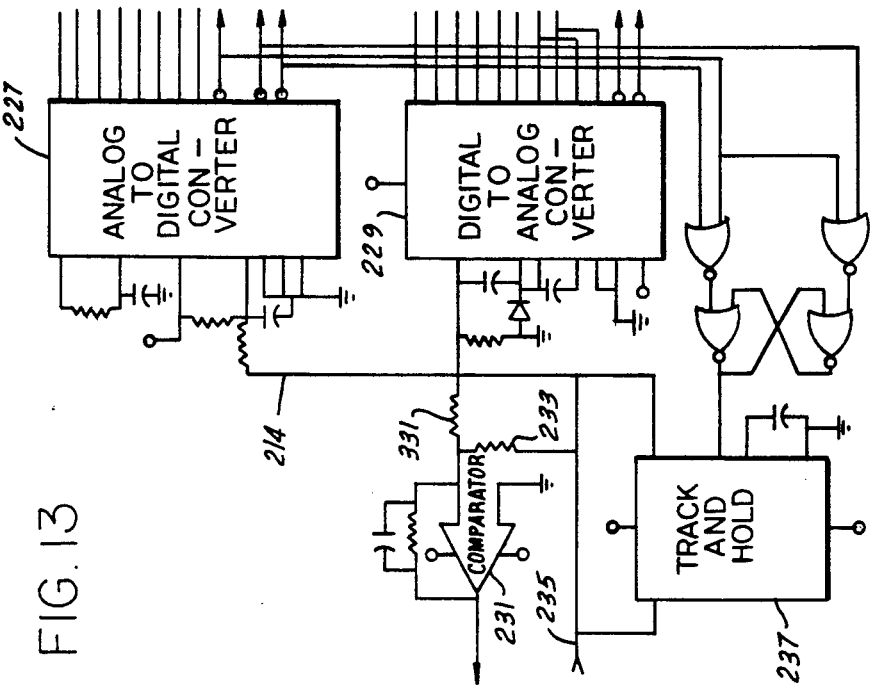
FIG. 13 is an electrical diagram partly in block form and partly in schematic form of the analog to digital and digital to analog converter, position measuring and servoing portion of the electrical diagram of FIG. 11.

The structure of the invention includes an electrical discharge machining head 10 as shown best in FIG. 1 operable in accordance with the method of the invention and in conjunction with the electrical circuit 11 shown best in FIG. 11 and flushing structure 13 to machine small holes 12 in an electrically conductive workpiece 14 such as a diesel engine fuel nozzle with a wire electrode 16.

The electrical discharge machining head 10 is adapted to be secured to and supported by an electrical discharge machine [not shown] but which includes electrical power circuits as shown in FIG. 11 for the movement of the electrical discharge machining head 10 and for accomplishing electrical discharge machining by providing appropriate pulses of electric spark discharge energy between the workpiece 14 and the wire electrode 16.

Figures 2, 3:
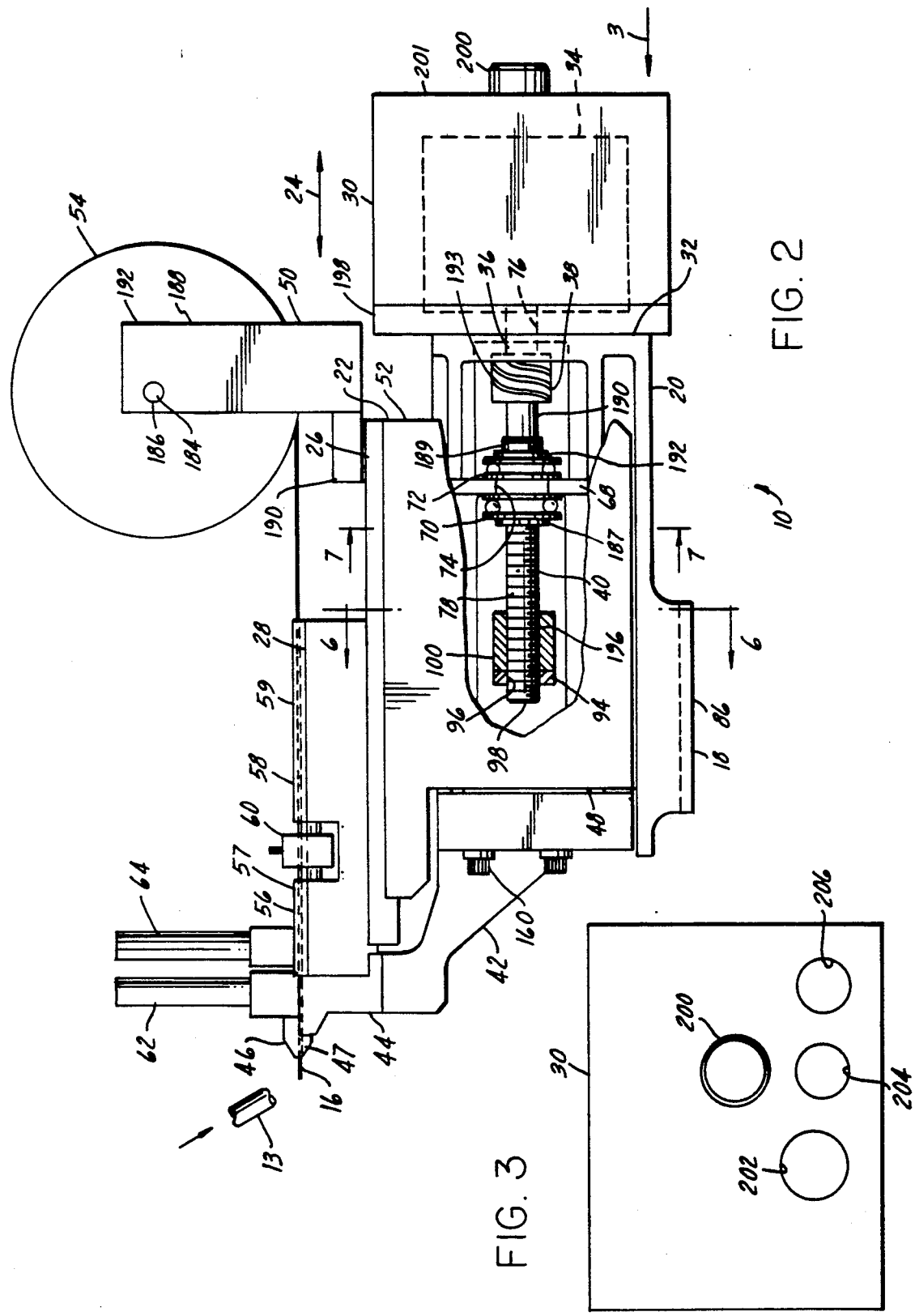
FIG. 2 is a partly broken away side view of the electrical discharge machining head illustrated in FIG. 1 taken in the direction of arrow 2 in FIG. 5.
FIG. 3 is a partial rearview of the electrical discharge machining head illustrated in FIG. 1 taken in the direction of arrow 3 in FIG. 2.

The electrical discharge machine to which the electrical discharge machining head 10 is secured also includes the flushing means 13 as shown diagramatically in FIGS. 2 and 11 for flushing between the workpiece 14 and electrode 16 with water, light, oil or the like.

Bolts [not shown] may be passed through the electrical discharge machining head 10 at surface 18 as desired for mounting the electrical discharge machining head 10 on an electrical discharge machine.

Electrical discharge machines of this general type are disclosed in U.S. Pat. Nos. 3,533,289; 3,601,572 and 3,614,371. Reference is made to these patents for disclosure of early basic structure for and methods of machining small holes in electrically conductive workpieces by electrical discharge machines.

The electrical discharge machining head 10 of the invention includes a body member 20 for supporting a slide 22 for reciprocal movement therealong in the direction of arrows 24. An extension plate 26 is secured to the slide 22 for movement therewith and supports a wire cartridge 28. Motor housing 30, shown in rear view in FIG. 3, is secured to end 32 of the body member 20 and supports motor 34 having shaft 36 connected by flexible coupling 38 to the screw and nut drive means 40 connected between the body member 20 and slide 22.

A support arm 42 for supporting an electrode guide holder 44 and electrode guides 46 and 47 are secured to the opposite end 48 of the body member 20. A plastic wire electrode spool support 50 is secured to the extension plate 26 adjacent end 52 of slide 22 for receiving a spool 54 of electrical discharge machining electrode wire 16.

Figure 4:
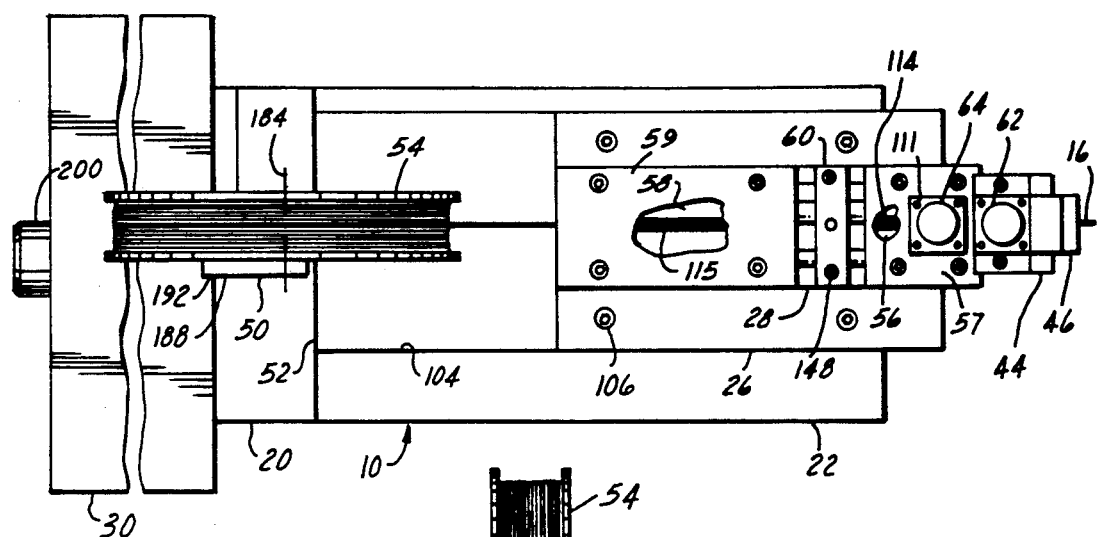
FIG. 4 is a partly broken away top view of the electrical discharge machining head illustrated in FIG. 1 taken in the direction of arrow 4 in FIG. 1.
Figure 5:
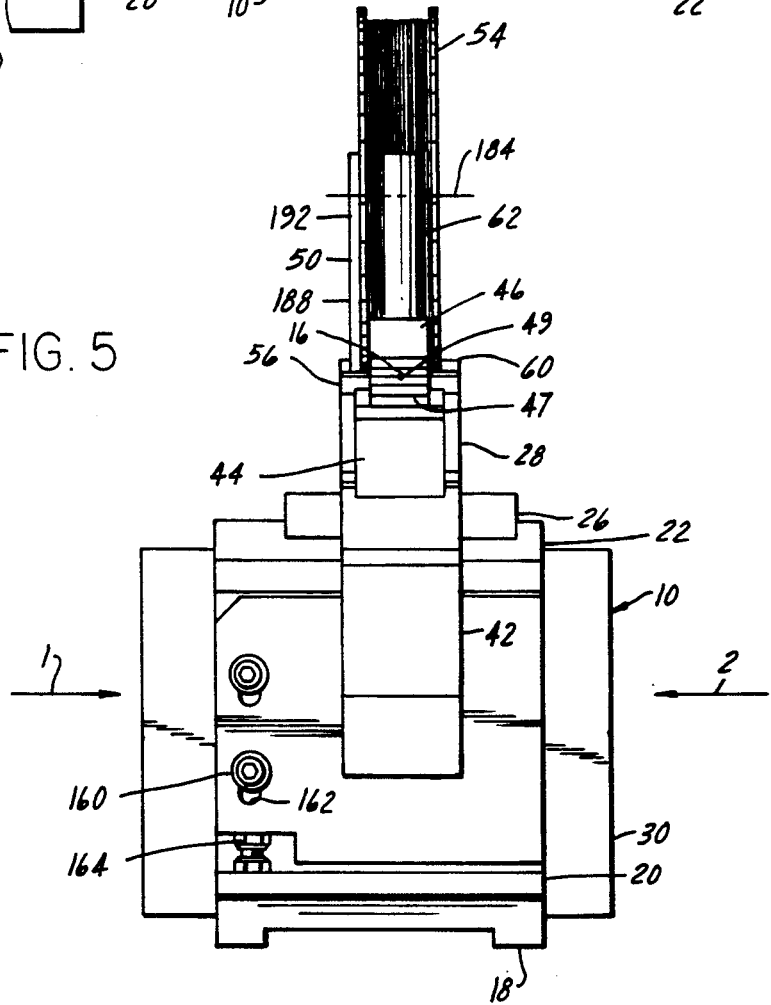
FIG. 5 is a front view of the electrical discharge machine head illustrated in FIG. 1 taken in the direction of arrow 5 in FIG. 1.
Figure 6:
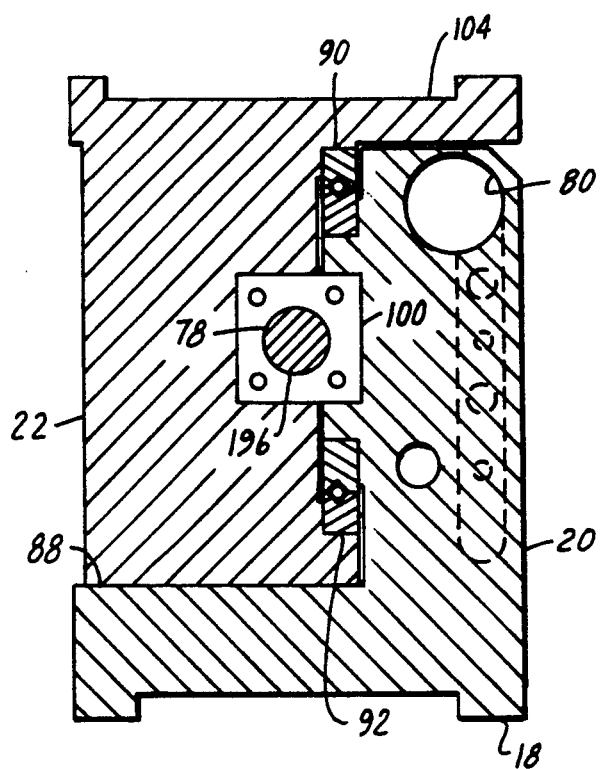
FIG. 6 is a section view of the electrical discharge machining head illustrated in FIG. 1 taken substantially on the line 6—6 in FIG. 2.
Figure 7:
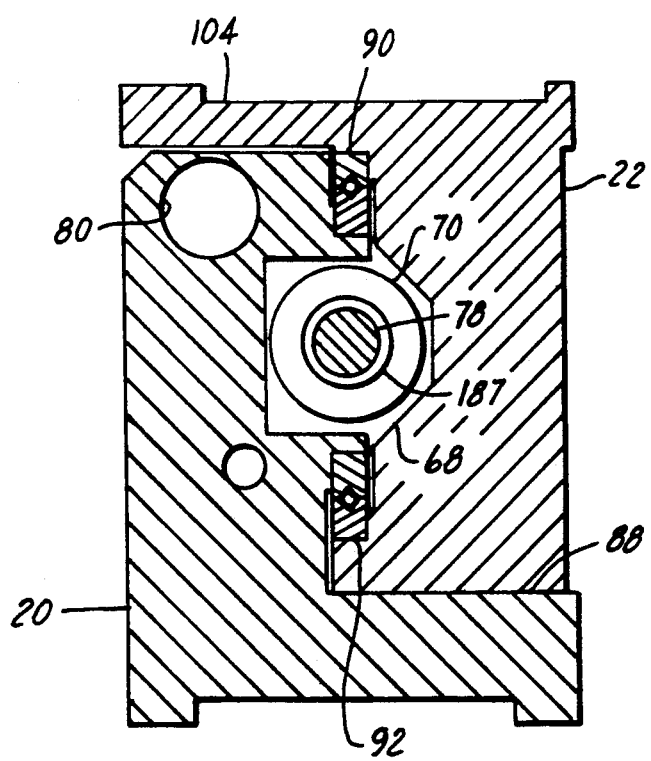
FIG. 7 is a section view of the electrical discharge machining head illustrated in FIG. 1 taken substantially on the line 7—7 in FIG. 2.

Front and rear electrode guide plates 56 and 58 are secured to the wire carriage as best shown in FIG. 4. A wire feeder block 60 is positioned between the front and rear guide plates 56 and 58 on the wire cartridge 28. Front and back electrode clamps 62 and 64 are secured to the wire guide holder 44 and to wire cartridge 58 through front guide plate 56 respectively.

More specifically, the body member 20 shaped as shown in FIGS. 1 through 7 slidably supports the slide 22 thereon. Body member 20 includes the flange or partition 68 for supporting bearings 70 and 72 of the screw and nut structure 40. Aligned openings 74 and 76 are provided in the partition 68 and the end 32 of the body member 20 for receiving the screw 78 of the screw and nut structure 40 and the shaft 36 of the motor 34 respectively.

Axially extending cylindrical opening 80 is also provided in the end 32 of body member 20 for receiving a linear variable differential transformer 242 which will be considered subsequently and which is operable to relative position of the body member 20 and slide 22.

Slide 22 again, shaped as shown best in FIGS. 1 through 7 is supported on linear bearings 84 and 86 for sliding movement of the carriage 22 axially of the body member 20 in the direction of arrows 24 previously indicated.

Slide 22 also includes a partition 94 having an opening 96 extending therethrough for receiving the end 98 of the screw 78. Partition 94 supports the nut 100 of the screw and nut structure 40 as shown best in FIG. 2.

A recess 102 is provided in the slide 22 as best shown in FIG. 1 for receiving a support member 103 for a portion of the linear voltage differential transformer structure 242 operable to sense relative position between the slide 22 and body member 20 as will be considered in more detail subsequently.

The extension plate 26 is carried in the axially extending recess 104 in the top of the slide 22. Extension plate 26 is rigidly secured to the slide 22 by convenient means such as bolts 106 or the like.

Wire cartridge 28 is rigidly secured to extension plate 26 again by convenient means such as bolts [not shown] and supports front and rear electrode guide plates 56 and 58, having T-shaped sections with stem portions 90 and 92 extending into recesses 108 and 110 in wire cartridge 28. The feeder block structure 60 is secured in the recesses 138 and 140 in the wire cartridge 28 as shown best in FIGS. 9 and 10 and the back electrode clamp 64 is secured to the wire cartridge 28 through the front guide plate 56, and cover plate 57 therefore to which it is secured by convenient means such as bolts 111.

Figure 10:
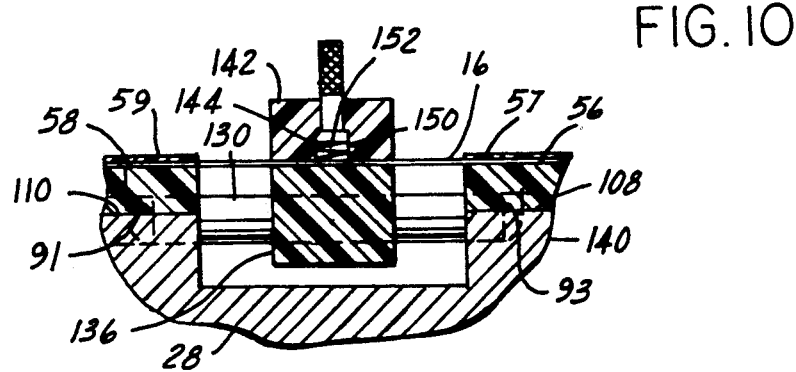
FIG. 10 is a partial section view of the electrical discharge machining structure illustrated in FIG. 1 taken substantially on the line 10—10 in FIG. 9.

As shown best in FIG. 10, the guide plates have a T-shaped cross section including a stem portion mating with the recesses 108 and 110 in the wire cartridge 28. Guide plates 56 and 58 are constructed of plastic and plastic cover sheets 57 and 59 as shown in FIG. 10 are provided thereover. V-shaped grooves 114 and 115 are provided in the upper surface of the guide plates 56 and 58 for guiding the wire electrode 16 in its travel from the spool 54 to the wire guides 46 and 47.

Figure 9:
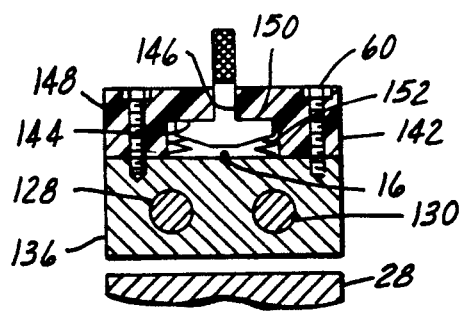
FIG. 9 is a partial section view of the electrical discharge machining structure illustrated in FIG. 1 taken substantially on the line 9—9 in FIG. 10.

Feeder block structure 60 as shown best in FIGS. 9 and 10 is also constructed of plastic and includes a pair of spaced apart shafts 128 and 130 mounted in recesses 138 and 140 in the wire cartridge 28. A feeder block body member 136 is mounted on the shafts 128 and 130 for sliding movement axially of the wire cartridge 28 with the shafts 128 and 130 extending through the openings 132 and 134 in the feeder block body member 136.

A top member 142 of the feeder block structure 60 is provided with a recess 144 therein and an opening 146 therein extending into the recess 144 shown. The top member 142 of the feeder block structure 60 is secured to the body member 136 thereof by convenient means such as bolts 148. A wire grip 150 shaped as shown in FIG. 9 is positioned in the recess 144 and is urged away from wire electrode 16 extending through feeder block 60 by spring means 152 to allow the wire electrode 16 to move freely through the feeder block 60 when manual feeding is not desired.

Feeder block 60 serves to permit feeding the wire electrode 16 by hand if desired and facilitates gripping of the wire for such manual feeding on depressing of the wire grip 50 with reduced danger of bending or crimping the electrode wire.

Figure 8:
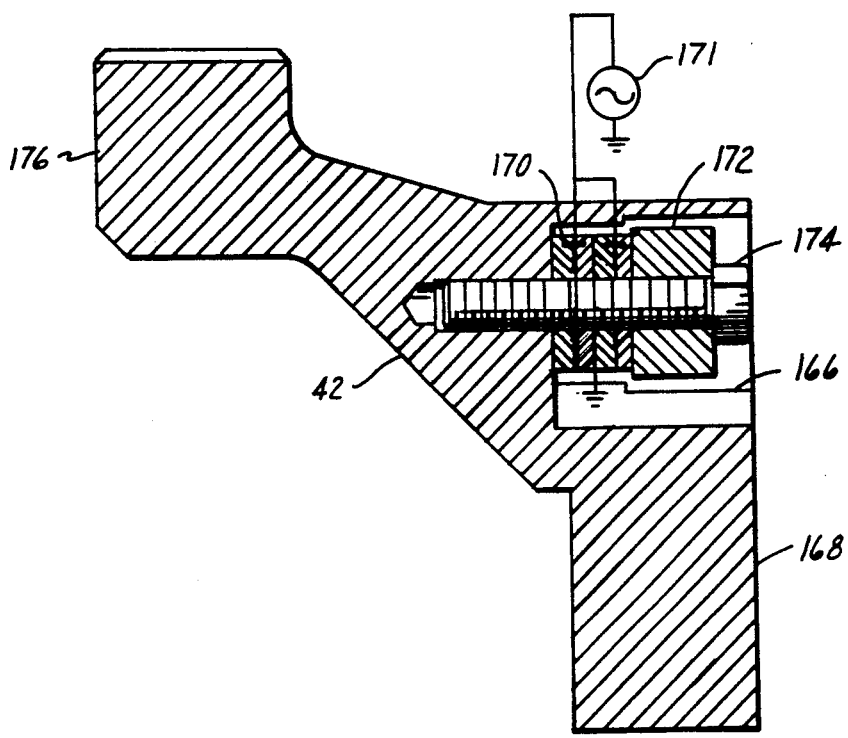
FIG. 8 is a partial section view of the electrical discharge machining structure illustrated in FIG. 1 taken substantially on the line 8—8 in FIG. 5.

The support arm 42 shaped as best shown in FIGS. 1 through 7 and shown in section in FIG. 8 is secured to the body member 20 of the electrical discharge machining head 10 by convenient means as bolts 160. The vertical position of the support arm 42 is adjustable due to vertically enlarged slots 162 in the support arm 42 in cooperation with the bolts 160. The vertically adjusted position of the support arm 42 is determined by the vertical adjusting screw and nut structure 164 shown best in FIGS. 2 and 4.

As shown best in FIG. 8, the support arm 42 is provided with a dual diameter recess 166 in surface 168 in which a plurality of annular piezeoelectric crystals 170 are positioned. The crystals 170 and a weight 172 are secured in recess 166 by bolt 174. The crystals 170 are polarized to provide maximum expansion and contraction axially of the bolt 174 on an alternating electrical signal being applied thereto.

In operation an alternating electrical signal at ultrasonic frequency is supplied to the crystals 170 from the source of electrical energy 171. The alternating electrical signal produces ultrasonic vibration of the end 176 of the support arm 142 to ultimately supply ultrasonic vibration of the wire electrode 16 in use in accordance with the invention.

Guide holder 44 again shaped as best shown in FIGS. 1 through 6 is supported on the support arm 42 by convenient means such as bolts [not shown]. In turn the guide holder 44 supports the wire electrode guides 46 and 47 which are also secured thereto by convenient means [not shown]. Wire electrode guides 46 and 47 are provided with an opening 49 therethrough through which the wire electrode 16 passes.

The front and back electrode clamps 62 and 64 are pneumatically actuated piston and cylinder structures which are secured respectively to the guide holder 44 and the front guide plate 56 by convenient means such as bolts 111. The cylinders 62 and 64 include tips 180 which when the cylinders are actuated grip the wire electrode 16 passing therebeneath to securely hold the wire electrode 16 at a front or back position.

The wire electrode 16 is wound on wire spool 54. Wire spool 54 is mounted for rotation about axis 184 on axle 186. The spool 54 is supported from the extension plate 26 by the bracket 188 including bracket members 190 and 192 which are connected to each other and to the extension plate by convenient means such as bolts [not shown].

The carriage 22 is mounted on the body member 20 of the electrical discharging machine head 10 for reciprocal sliding in the direction of arrows 24 as indicated above. The movement of the carriage 22 on the body member 20 is effected by the screw and nut structure 40.

The screw 78 is a precision screw having a very fine pitch and is mounted for rotation in the bearings 70 and 72 secured in a fixed position on the body member 20 on opposite sides of the partition 68.

As shown best in FIG. 1, the screw 78 is provided with an annular flange 187 therearound for urging the bearing 70 into contact with the partition 68 and threads 189 are provided on the end 190 of the screw 78 to receive a locking nut 192 for securing the other bearing 72 against the partition 68.

The end 190 of the screw 78 is secured to the motor shaft 36 by means of the spiral coupling 38 therebetween. Coupling 38 is provided to couple the shaft 36 to the screw 78 without applying transverse forces to the screw 78. To this end, the coupling 38 is provided with spiral slot 193 therein so that it is somewhat flexible transversely of screw 78.

The nut 100 of the nut and screw structure 40 is initially a rather loose fit on the screw 78. A settable plastic material 196 under pressure is injected between the nut 100 and screw 78 in mesh whereby substantially all clearance is removed between the nut 100 and screw 78. That is to say substantially no clearance exists between the nut and screw 78 which is not taken by the settable plastic injected between the nut and screw. The nut 100 is then mounted on the partition 94 of the carriage 20 by convenient means such as bolts.

Rotation of the motor 34 to rotate shaft 36 thus provides movement between the carriage 22 and body member 20 under control of nut and bolt structure 40 to provide relatively cheap, efficient and very accurate controlled movement of the carriage.

The motor housing 30 as previously indicated houses the motor 34 including shaft 36 which extends through the front wall 198 of the motor housing 30 to which the motor 34 is. secured by convenient means not shown.

Electrical connections to the electrical discharge machining head 10 are made through the motor housing 30. To this end, the back 201 of the housing 30 supports the motor shaft centrally thereof in bearing receptical 200 and is provided with a motor power plug, electrical connections to the linear voltage differential transformer and electrical discharge machining energy plugs 202, 204, and 206 respectively, shown in FIG. 3.

Figure 15:
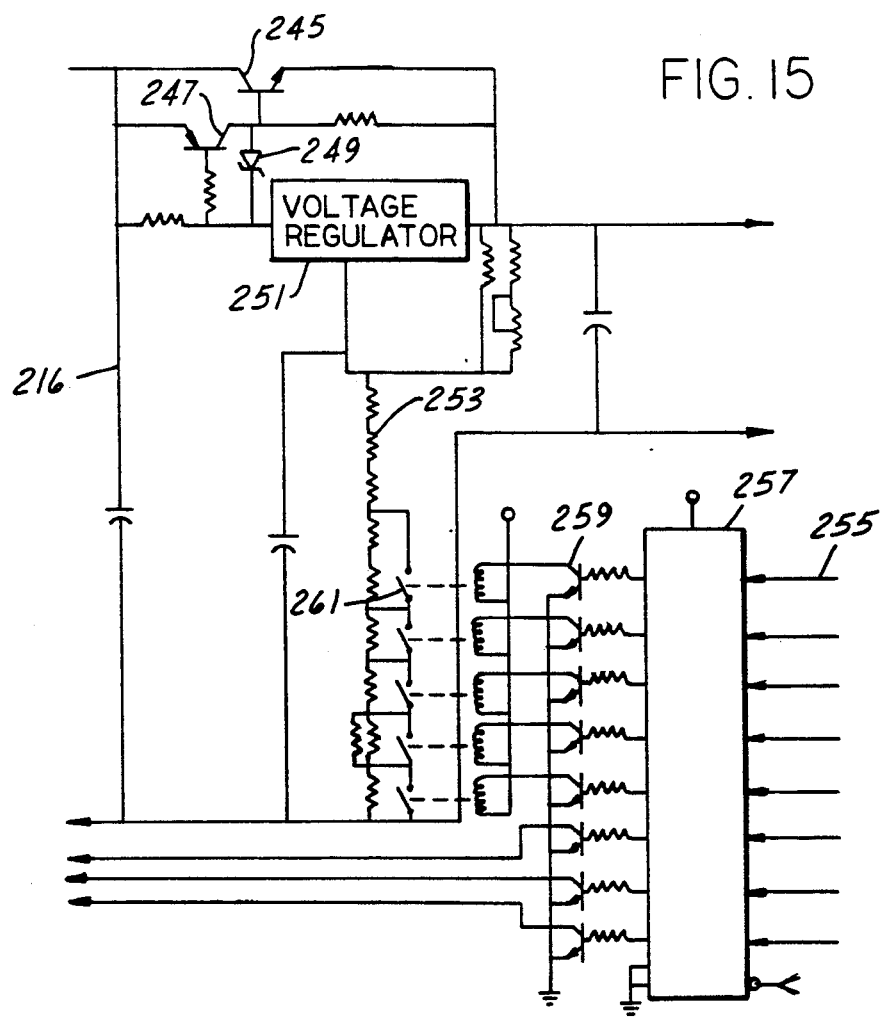
FIG. 15 is an electrical diagram partly in block and partly in schematic form of the variable direct current power supply portion of the electrical diagram of FIG. 11.
Figure 16:
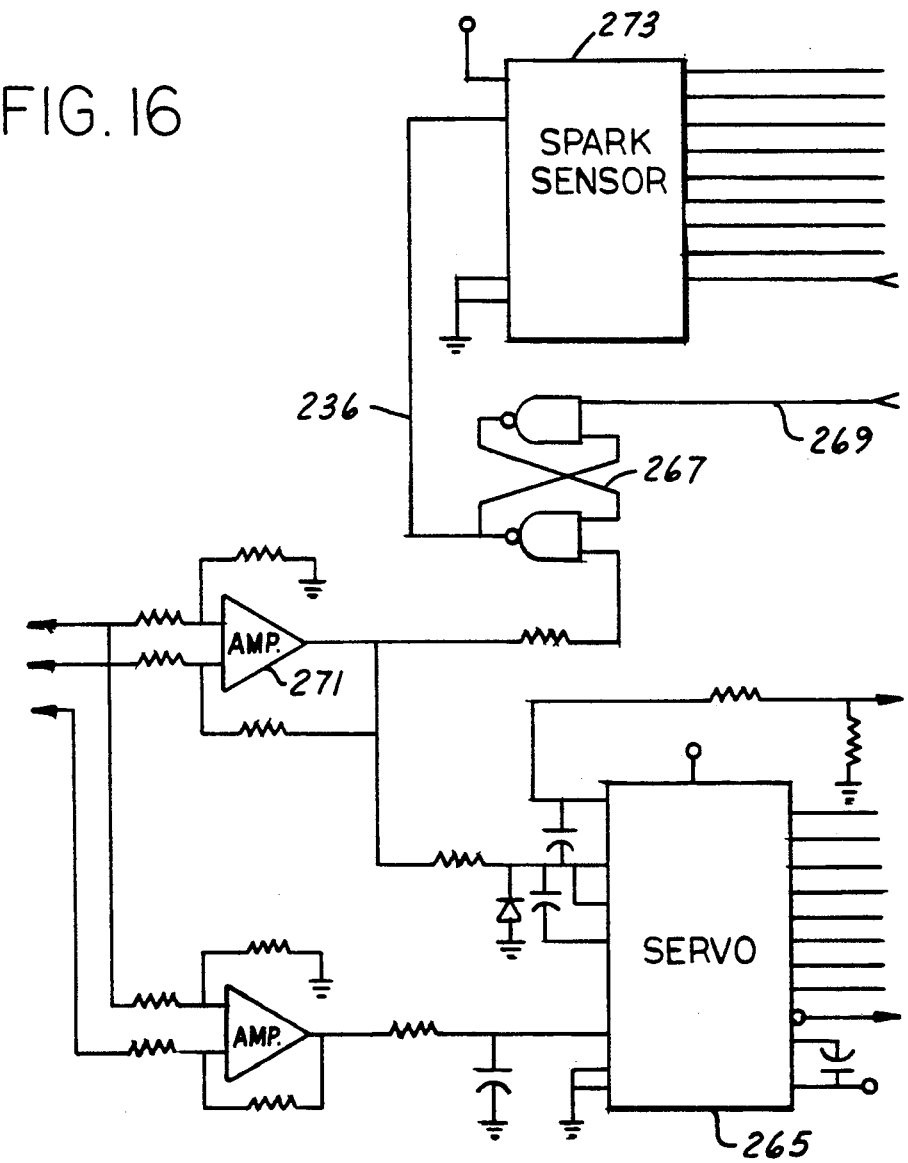
FIG. 16 is an electrical diagram partly in block and partly in schematic form of the servo and spark sensor portion of the electrical diagram of FIG. 11.
Figure 17:
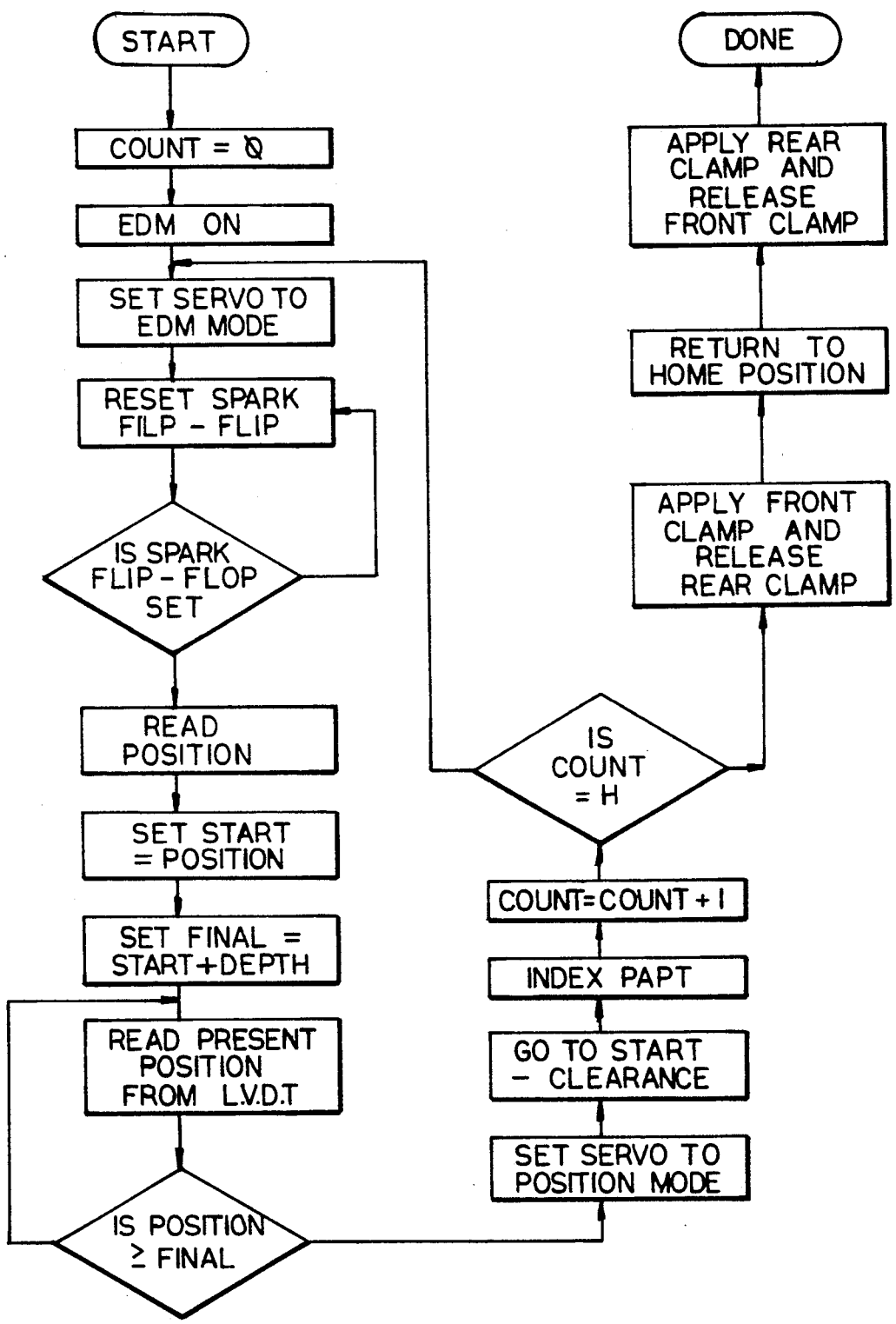
FIG. 17 is an algorithm or flow chart for the operation of the electrical discharge machining structure illustrated in FIGS. 1 through 16 in accordance with the method of the invention.

Overall operation of the electrical discharge machining structure of the invention in accordance with the method of the invention will be considered in conjunction with the electrical diagrams of FIGS. 11 through 16 and the flow chart in FIG. 17.

The control circuit 208 for the electrical discharge machining head 10 illustrated in FIGS. 1 through 10 as shown in FIG. 11 includes a Central Processing Unit 210 which in a preferred embodiment of the invention is a SBC 80116 microprocessor obtainable from Intel Instruments Corporation of California. The microprocessor 210 is readily programmable by those in the art to effect operation in accordance with the method of the invention as set forth in the flow chart of FIG. 17. A specific program will not therefore be considered in detail herein.

The control circuit 208 further includes the multibus interface circuit 212 operable to interface signals between the microprocessor 210 and the other circuit elements. Thus, in the usual manner the multibus interface 212 receives information from the microprocessor 210 in the form of electrical energy signals which must be varied before being presented to the other circuit elements and receives similar but different electrical energy signals from the other circuit elements which also must be changed in energy content and/or form before being transmitted to the microprocessor 210.

Figure 12:
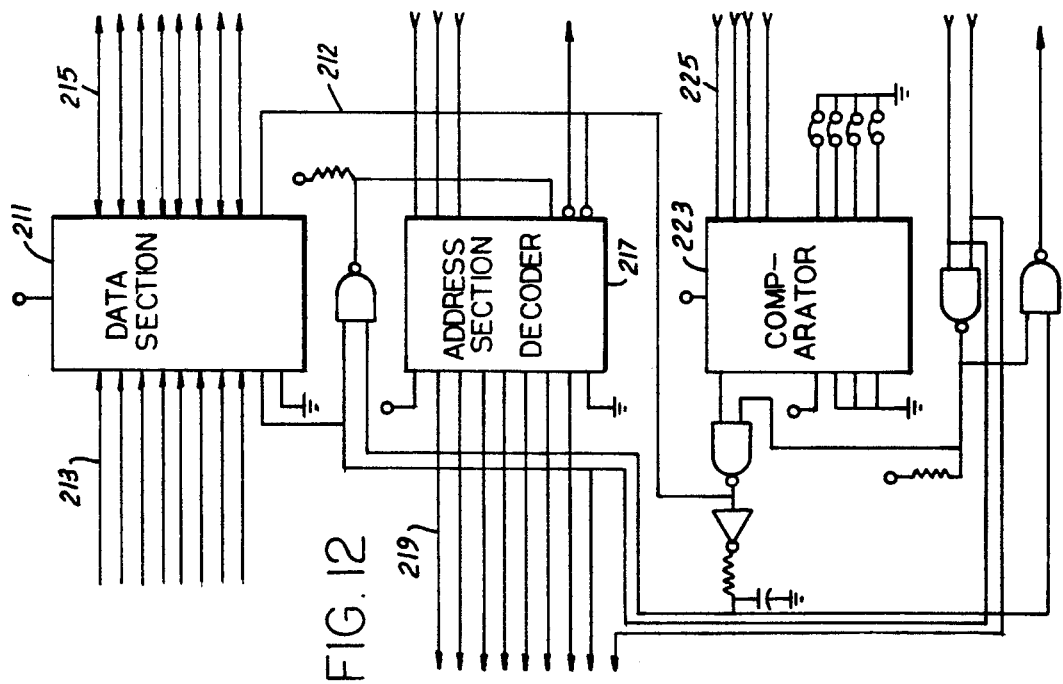
FIG. 12 is an electrical diagram partly in block form and partly in schematic form of the multibus interface portion of the electrical diagram of FIG. 11.

As shown in FIG. 12 the multibus interface circuit 212 includes a data section 211 for operating on sensor data received from and transmitted to the control circuits over conductors 213 and on data received from and passed to the Central Processing Unit 210 over conductors 215. Section 217 of circuit 212 is a decoder which selects an address for each data bit transmission over conductors 219 in accordance with an address code provided from the Central Processing Unit on conductors 221. Section 223 of the multibus interface circuit 212 which is a comparator provides control of sections 211 and 217 in accordance with the program of the Central Processing Unit 210 and instructions received from the Central Processing Unit over conductors 225.

The analog to digital converter and digital to analog converter, position measuring and servoing circuit 214 performs similar functions in that it receives a signal from and passes signals to the multibus interface curcuit 212 and itself converts between analog and digital signals from the multibus interface circuit 212 and the other components of the control circuit 208 in the analog to digital converter 227 and in the digital to analog converter 229 to permit proper operation of the other elements of the electrical discharge machining circuit 208 under control of the microprocessor 210.

Comparator 231 compares a desired position signal from the digital to analog converter 229 through resistor 331 as programmed from the Central Processing Unit 210 to an actual position signal from the linear voltage differential transformer sensor 242 through resistor 233 and conductor 235 to provide a position error signal effective to move carriage 22 toward a desired position therefore. Circuit 237 is a track and hold circuit effective to hold electrical signals steady while they are being read to ensure desired operation of circuit 214.

Such interface converter, comparator and track and hold structure is again well known in the art as to both its form and function.

Figure 14:
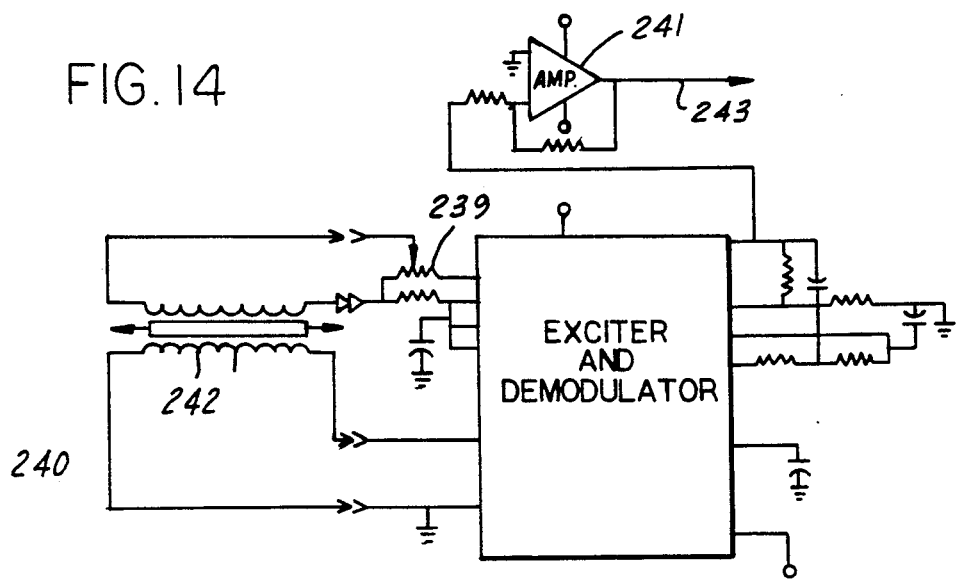
FIG. 14 is an electrical diagram partly in block form and partly in schematic form of the linear voltage differential transformer, exciter and demodulator portion of the electrical diagram of FIG. 11.

The linear voltage differential transformer, exciter and demodulator circuit 240 as shown in detail in FIG. 14, besides the linear voltage differential transformer 242 includes the potentiometer sensitivity control 239 and the amplifier 241 offering control of the output signal of the linear voltage differential transformer. Again, such circuits for providing an output signal on conductor 243 proportional to the relative position of the body member and carriage are in themselves known.

The variable direct current electrical power supply 216 obtains a direct current signal from the rectifier 218 provided with an alternating current signal from the normal industrial electrical supply lines 220 serviced by a public utility or the like.

As shown best in FIG. 15 the input signal from rectifier 218 is limited across power amplifier 245 and driver amplifier 247. The voltage regulator 251 protected by zener diode 249 determines the maximum voltage available for electrical discharge machining from circuit 216. As referred to above, voltage divider 253 is provided to permit control of electrical discharge machining voltage in two volt increments between one hundred and one hundred seventy five volts to precisely control hole size. Control of the machining voltage through the voltage divider is accomplished from the Central Processing Unit 210 over conductors 255, signal holding circuit 257 amplifiers 259 and relay switches 261.

The power supply 216 under the control of the Central Processing Unit 210 will energize relay 222 to close the switches 224 as desired. Similarly, the polarity relay 226 may be energized through the power supply 216 on command of the Central Processing Unit 210 to change the position of the switches 228 to reverse the polarity of electrical signals applied between the electrode 16 and workpiece 14.

Electrical discharge machining energy is provided over conductors 232 and 234 from the resistance, capacitance power supply 216. In accordance with the invention, the output parameters of the power supply 16 on conductors 232 and 234 may be varied under the control of the microprocessor 210 to provide for example 100 to 175 volt electrical discharge machining energy in two volt increments as set forth above while the capacitance of the capacitor 263 may be varied in one-thousandths of a microfarad between one one-thousandth and four one-hundredths microfarads.

Similarly, current in the electrical discharge machining circuit 208 on conductors 232 and 234 and the speed of the servo motor 34 which controls the speed of advance of the carriage 22 relative to the body member 20 of the electrical discharge machining head 10 may be varied under the control of the central processing unit 210 through the servo and spark sensor circuit 236. In addition to a normal electrical discharge machining servo drive circuit 265 fed through amplifier 250, the servo and spark sensor circuit 236 as shown in FIG. 16 includes a multi-vibrator fed a reset signal over conductor 269 and a set signal through amplifier 271 and a spark sensor circuit 267 operable to provide and output pulse on conductor 236 to the circuit 273 on occurance of the first spark between the electrode 16 and workpiece 14 as sensed across conductors 232 and 234.

In operation as shown in FIG. 17, a count is entered in the Central Processing Unit 210 if it is not already programmed into the unit. The count indicates the number of holes to be electrical discharge machined in a particular workpiece.

The electrical discharge machining circuit 208 is then provided with electrical discharge machining power automatically under the control of the Central Processing Unit 210.

The switch 246 is switched from the position error mode to the electrical discharge machining mode. This may be done automatically by the Central Processing Unit 210 through the circuit 216 or may be accomplished by manually actuating the switch 246.

The multi-vibrator or flip-flop 267 in the servo and spark sensor circuit 236 is reset by a clock pulse from the Central Processing Unit 210 and the state of the multi-vibrator in the servo and spark sensor circuit 236 is repeatedly checked until it is found to be set, that is until its condition has changed, indicating that the electrode 16 and workpiece 14 have approached sufficiently close to each other to cause a spark therebetween.

On the occurance of a spark between the electrode 16 and a workpiece 14 as sensed by the servo and spark sensor circuit 236 the position of the carriage 22 relative to the body member 20 is sensed by the Central Processing Unit through the linear voltage differential transformer exciter demodulator circuit 240 and interface 212. This temporary position of the carriage is then recorded by the Central Processing Unit and the temporary position plus the depth of the electrical discharge machining required are utilized in the Central Processing Unit to provide a final depth which is equal to the temporary position plus the depth of the electrical discharge machining cut desired.

The linear voltage differential transformer exciter demodulator circuit 240 provides an output signal to the Analog to Digital and Digital to Analog Converter and position Measuring and Servoing, circuit 214 through amplifier 244 representative of the relative positions of the body member 20 and carriage 22.

Switch 246 is operable by means of solenoid 248 under control of the Central Processing Unit 210 through the variable direct current power supply circuit 216 and latch 257 to place the electrical discharging machining head 10 in either a position error mode as shown in FIG. 11 or in an electrical discharge machining mode with switch 246 in its alternative position not shown in FIG. 11.

With switch 246 as shown in FIG. 11, that is with the electrical discharge machining head 10 in the position error mode, a signal is provided through amplifier 250 to the motor 34 to drive the carriage 22 along the body member 20 in accordance with the position sensed by the linear variable differential transformer 242 and the desired position as programmed in the Central Processing Unit 210.

With the switch 246 in an electrical discharge machining mode the motor 34 is actuated in accordance with the electrical signal across the gap between the electrode 16 and workpiece 14 in the usual manner through amplifier 250.

Electrical discharge machining then proceeds with the Central Processing Unit periodically checking the position of the carriage relative to the body member 20 through the Linear Voltage Differential Transformer 242 to determine if the relative position of the carriage 22 and body member 20 is the final desired relative position thereof at the end of the desired electrical discharge machining. When the Central Processing Unit 210 senses the final depth of electrical discharge machining cut, that is the temporary depth plus the depth of cut desired, the switch 246 is automatically placed in the positioning mode, that is, as shown in FIG. 11 and the electrode 16 is moved away from the workpiece 14 to the temporary depth plus clearance or home or start position which is originally set in the Central Processing Unit, to permit indexing of the workpiece to a position for an additional hole to be electrical discharge machined in the workpiece.

The Central Processing Unit then counts its previous count plus one and the total count is checked against the number of holes it is desired to electrical discharge machine in the workpiece. If the count is not equal to the count programmed into the Central Processing Unit at the initiation of work on the particular workpiece, the switch 246 is again returned to the electrical discharge machine mode the spark sensing flip-flop is reset and the above procedure is repeated to machine an additional hole in the workpiece.

If the count at the end of electrical discharge machining a hole in the workpiece is equal to a count programmed into the Central Processing Unit indicating that all of the holes are machined in the workpiece, the front clamp 62 is applied to grip the electrode 16 against the guide holder 44 and the back clamp 64 is released. The carriage 22 is then driven to its home position under control of the Central Processing Unit and the rear clamp is again actuated to secure the electrode and the front clamp 62 is released. Feeding of the electrode 16 is thus accomplished and the electrical discharge machine of the invention is ready to execute the above sequence of operation again on a different workpiece.

It will be understood that in accordance with a particular program in the Central Processing Unit, feeding of the wire electrode 16 may be accomplished after each hole is electrically discharge machined into the workpiece 14.

Further, it will be understood that during the cutting of an opening 12 in the workpiece 14 that the cutting parameters that is electrical discharge machining voltage, current, reactance [particularly capacitive reactance], and servo speed may be varied as desired under control of the Central Processing Unit 210 to provide a particularly efficient electrical discharge machining operation.

As desired and again under the control of the Central Processing Unit 210 the polarity relay 226 may be energized to reverse the polarity of cutting between the electrode 16 and the workpiece 14 at the start of an electrical discharge machining operation whereby the tapered end of the wire electrode 16 may be rapidly burned away to provide an electrode which has a desired configuration for electrical discharge machining as set forth above.

Also, during electrical discharge machine with the structure of the invention and as set forth above, an alternating electrical signal at ultrasonic frequency may be applied to the piezoelectric crystals in the support arm 52 to ultimately produce ultrasonic vibration of the wire guides 46 and 47 electrode 16 to further increase the efficiency of the electrical discharge machining and reduce friction on the wire electrode.

Flushing is carried on during electrical discharge machining, in accordance with the method of the invention at a low velocity so as not to displace the wire electrode due to flushing.

The following is an implementation in the Forth computer programming language of the above method with the structure of the invention.

| EDM software - constant, variables, primitives | |
|---|---|
| 5 CONSTANT HOLES | [set to 5 holes in each part] |
| 200 CONSTANT DEPTH | [the holes have depth value of 200] |
| 500 CONSTANT HOME | [the home position is 500] |
| VARIABLE START | [storage for start of hole] |
| VARIABLE FINAL | [storage for end of hole] |
| The following are descriptions of simple primitive routines required to run the actual system hardware. | |
| EDM-ON | [turns on the EDM cutting power] |
| EDM-OFF | [turns off the EDM cutting power] |
| POSN | [switches the servo to positioning] |
| EDMNG | [switches the servo to edmming] |
| CLAMP-FWD | [sets forward clamp and releases rear clamp] |
| CLAMP-REAR | [sets rear clamp and releases forward clamp] |
| WHERE | [-- n] [reads the voltage from the LVDT circuit] |
| SET-POSN | [n --] [moves the slide to the given position] |
| SPARK-RESET | [resets the spark sensing flip-flop] |
| ?SPARK | [-- f] [reads the spark sensing flip-flop] |
| EDM software - main program | |
| MAIN [ -- ] HOLES 0 | [set up loop] |
| DO | |
|   EDM-ON EDMNG SPARK-RESET | [start cutting] |
|   BEGIN ?SPARK UNTIL | [wait for contact] |
|   WHERE DUP START ! | [read position and] |
|   DEPTH + FINAL ! | [set depth of cut] |
|   BEGIN WHERE FINAL @ > UNTIL | [look for final depth] |
|   POSN START @ SET-POSN | [back out of hole] |
|   INDEX | |
| LOOP | |
| CLAMP-FWD HOME @ SET-POSN | [return to home] |
| CLAMP-REAR ; | [position, pulling] |
| | [out more electrode] |

While one embodiment of the invention has been considered in detail, it will be understood that other embodiments and modifications thereof are contemplated by the inventor. It is the intention to include all such modifications and embodiments of the invention as are defined by the appended claims within the scope of the invention.

We claim:

1. Structure for electrical discharge machining comprising an electrical discharge machine including an electrical discharge machining head, an electrode secured to the head for movement toward and away from a workpiece therewith, means on the head for moving the electrode on the electrical discharge machine head toward the workpiece, means connected between the electrode and workpiece for sensing a spark between the electrode and workpiece, means for controlling the depth of machining of the workpiece, means for controlling the depth of machining of the workpiece in accordance with the position of the electrode at the time the first spark is sensed between the electrode and workpiece and for subsequently retracting the electrode from the workpiece to a position at which there is predetermined clearance between the electrode and workpiece, wherein the means for controlling the depth of machining of the workpiece in accordance with the position of the electrode at the time the first spark is sensed between the electrode and workpiece includes means for recording the position of the electrode on occurence of the first spark as the electrode is moved toward the workpiece, wherein the means on the head for moving the electrode on the electrical discharge machine head toward the workpiece is a slide, further including means for clamping the electrode at a rearward location on the slide for movement of the electrode toward the workpiece and means for clamping the electrode at a forward position on the head following an electrical discharge machining operation while the means for clamping the electrode in a rearward position is released and moved away from the workpiece and for subsequently releasing the electrode at the forward position and clamping the electrode at the rearward position again to replenish worn away portions of the electrode.

2. A method of electrical discharge machining comprising advancing an electrode toward a workpiece from a clearance position until the electrode is sufficiently close to the workpiece to cause a spark to be produced between the electrode and workpiece and then proceeding directly to electrically discharge machine the workpiece without first withdrawing the electrode from the workpiece until a desired electrode movement following spark initiation is obtained and subsequently withdrawing the electrode from the workpiece to a predetermined clearance position, and further including repeating the method of electrical discharge machining a plurality of times without feeding the electrode to compensate for electrode wear and only then subsequently automatically feeding the electrode to compensate for electrode wear wherein the feeding of the electrode includes the steps of securely holding the electrode in a rearward location on a slide for advancing the electrode relative to a cutting head during advancing and cutting with the electrode and subsequently after cutting is completed, releasing the electrode at the rearward location and clamping it at a forward location to the cutting head whereby on withdrawal of the slide relative to the cutting head, releasing the electrode at a forward location and again clamping the electrode to the slide at the rearward location, the electrode is positioned closer to the workpiece on subsequent movement of the slide toward the workpiece to compensate for electrode wear.

* * * * *